July 14, 1942.　　　W. A. THUM　　　2,289,943
ARTICLE HANDLING MACHINERY
Filed Feb. 23, 1939　　　2 Sheets-Sheet 1
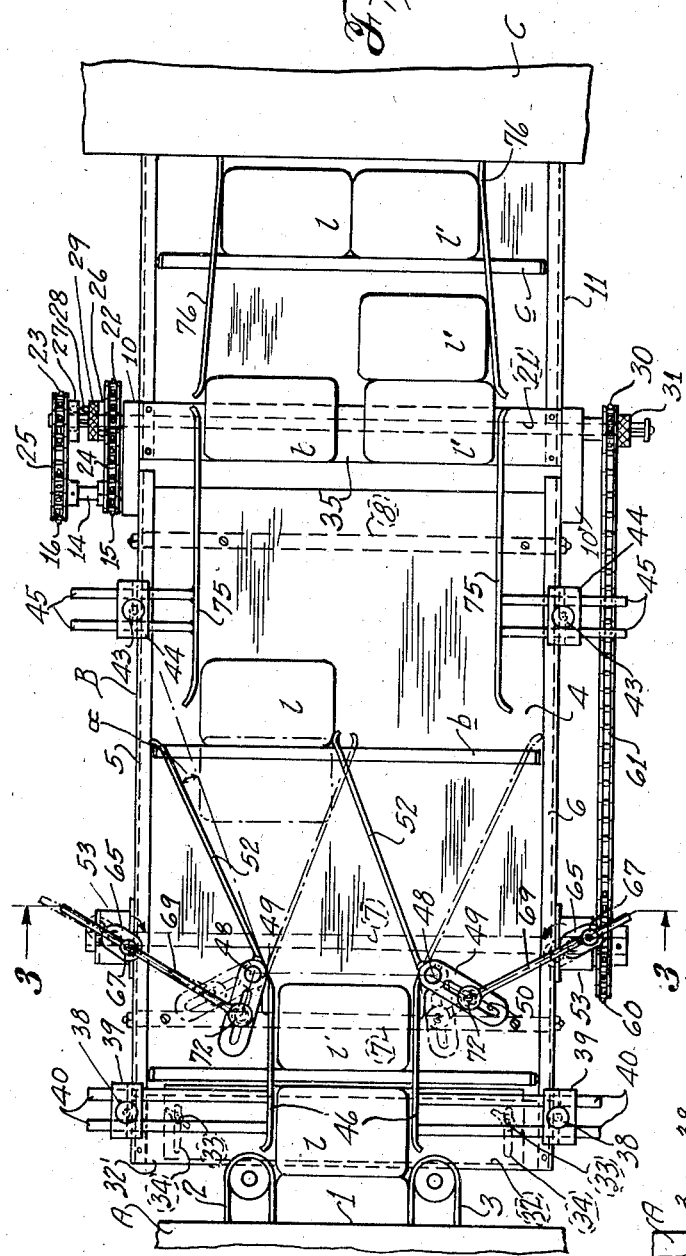
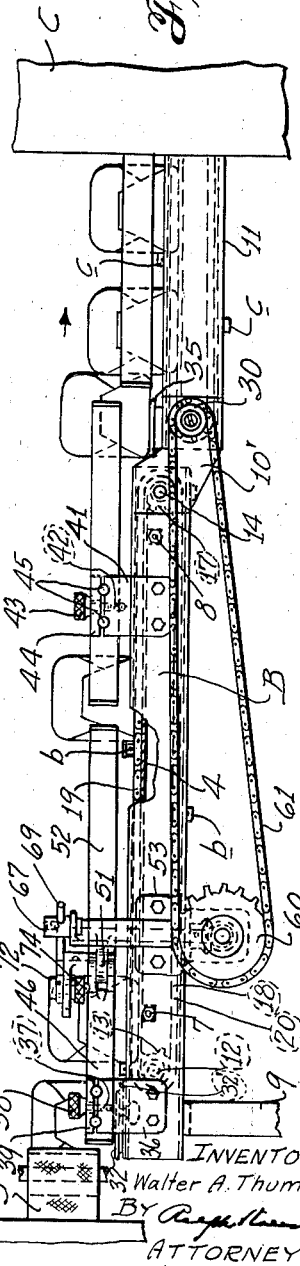
INVENTOR
Walter A. Thum.
ATTORNEY

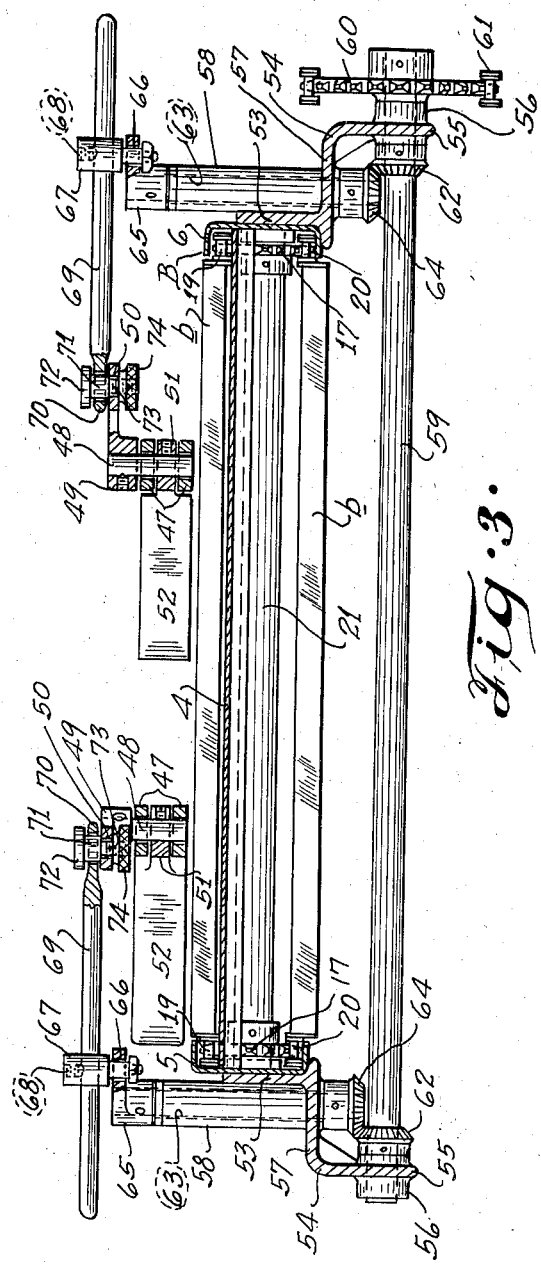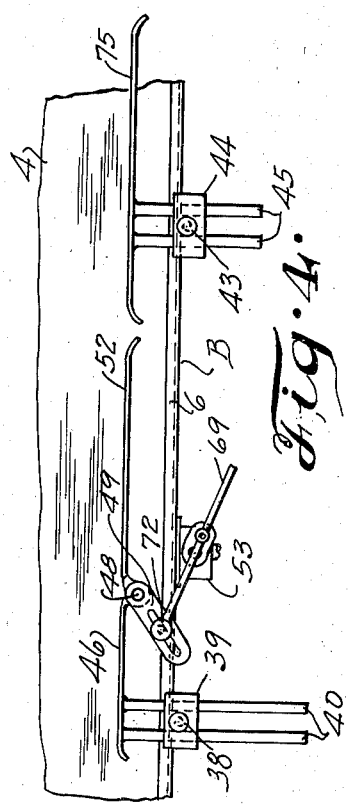

Patented July 14, 1942

2,289,943

UNITED STATES PATENT OFFICE 2,289,943

ARTICLE HANDLING MACHINERY

Walter A. Thum, St. Louis, Mo., assignor to Papendick, Inc., St. Louis, Mo., a corporation of Missouri Application February 23, 1939, Serial No. 257,836

8 Claims. (Cl. 198—31)

This invention relates generally to article handling machinery and, more particularly, to a certain new and useful improvement in machinery especially, though not exclusively, adapted to handle and transport rectilinear food articles, packages, and the like, such, for instance, as baked bread loaves or fractions thereof.

My invention has for its primary objects the provision of mechanism for the handling and packaging of bread loaves, which is unusually simple, economical, and efficient in construction and operation, which will shift a plurality of initially wrapped or packaged bread-loaf fractions from a consecutive series of single loaf fractions into consecutive groups of axially aligned loaf fractions, which is adapted to re-assemble the several fractions of an initially fractionated sliced loaf into full loaf relationship, which is adjustable to accommodate loaves and loaf fractions of varying length, which may be simply adjusted for operation as a conventional transfer conveyor when desired, and which is highly efficient in the performance of its stated functions.

And with the above and other objects in view, my invention resides in the novel features of form, construction, arrangement, and combination of parts presently described and pointed out in the claims.

In the accompanying drawings (2 sheets),

Figure 1 is a top plan view of an article handling mechanism constructed in accordance with and embodying my present invention;

Figure 2 is a side elevational view of the mechanism;

Figure 3 is a transverse sectional view of the mechanism, taken approximately along the line 3—3, Figure 1; and Figure 4 is a fragmentary top plan view of the article handling mechanism, illustrating the side guides in a modified position of adjustment.

Referring now in more detail and by reference characters to the drawings, which illustrate a preferred embodiment of my present invention, A designates a loaf wrapping machine having a rearwardly presented discharge aperture 1 and a pair of opposed parallel conveyor belts 2, 3, of any conventional design. Disposed beneath, and extending rearwardly from, the discharge aperture 1 of the wrapping machine A, is a transfer conveyor B including a table 4 operatively provided along its opposed longitudinal margins with channel-shaped side rails 5, 6, in turn, operatively held together by transversely extending brace rods 7, 8. At their forward end, the side rails 5, 6, are supported from the floor by leg members 9 and at their rearward end connected by means of connector blocks or the like 10, 10', in forwardly and upwardly spaced relationship to the forward end of the intake conveyor 11 of a secondary wrapping machine C having a plurality of conventionally supported and driven parallel flight bars c.

Journaled at its ends in the side rails 5, 6, and extending horizontally beneath the forward end of the conveyor table 4, is an idler shaft 12 provided with a pair of sprockets 13 respectively positioned inwardly of and adjacent to the inner faces of the side rails 5, 6. Extending horizontally beneath the rearward extremity of the conveyor table 4 and journaled at its one end in the side rail 6 and adjacent block 10' and at its other end journaled in and projecting through both the side rail 5 and the opposite block 10, is a drive shaft 14 provided on its projecting end with a pair of axially spaced sprockets 15, 16. Intermediate its journaled ends, the shaft 14 is provided with a pair of sprockets 17 respectively positioned in peripheral alignment with the sprockets 13. Trained over the peripherally aligned pairs of sprockets 13, 17, is a pair of endless conveyor chains 18, each having an upper rearwardly traveling run 19 extending over the upper face of the conveyor table 4 and a lower return run 20 extending beneath the conveyor table 4. Conventionally mounted at their ends on, and extending transversely between, the conveyor chains 18, is a plurality of spaced parallel flight bars b, all as best seen in Figure 2 and for purposes presently more fully appearing.

The intake conveyor 11 of the secondary wrapping machine C is provided with a conventional conveyor shaft 21 extending horizontally beneath, and projecting outwardly on either side of, the forward end thereof. On its one projecting end, the shaft 21 is provided with a pair of freely rotating sprockets 22, 23, positioned in peripheral alignment respectively with the sprockets 15, 16, and connected thereto by drive chains 24, 25. The sprockets 22, 23, are provided with juxtaposed hubs 26, 27, each having an annular series of recesses for conventional pin clutch engagement with the pin member 28 of a clutch disk 29 slidably keyed upon the shaft 21. The tooth ratio between the sprockets 22 and 15 is 2—1, whereas the tooth ratio between the sprockets 16 and 23 is 1—1. It will be clear, therefore, that, when the pin clutch disk 29 is shifted into engagement with the hub 26 of the sprocket 22, the drive shaft 14 will be driven at twice the speed of the shaft 21, while when the clutch member 21 is engaged with the hub 27 of the sprocket 23, the shafts 14 and 21 will be driven at the same speed. On its opposite projecting end, the shaft 21 is provided with a freely rotating sprocket 30, which is drivingly connected to the shaft 21 by means of a conventional pin clutch and indexing mechanism 31, all as best seen in Figure 1 and for purposes presently more fully appearing.

Extending transversely across the forward end of the conveyor table 4, is a so-called dead-plate 32 provided with a pair of longitudinal slots 34 for adjustably accommodating threaded studs 33 mounted on a stationary dead-plate 32' suitably supported over the table 4 on channels 5, 6. Likewise mounted on, and extending horizontally across, the forward end of the intake conveyor 11, is a second so-called dead plate 35, all as best seen in Figure 2 and for purposes presently more fully appearing.

Bolted or otherwise rigidly secured upon the outwardly presented faces of, and projecting upwardly from, the opposite side rails 5, 6, is a pair of parallel bracket members 36 each formed with an upper flanged portion provided centrally with a threaded vertical recess 37 for receiving a knurled thumb screw 38 for securing thereupon a clamping plate 39. Shiftably held between the bracket 36 and the clamping plate 39 on opposite sides of the screw 38, is a pair of parallel supporting rods 40. Similarly bolted or otherwise rigidly secured upon the outwardly presented faces of, and projecting upwardly from, the opposite side rails 5, 6, is a pair of parallel bracket members 41 each likewise formed with an upper flanged portion provided centrally with a threaded vertical recess 42 for receiving a knurled thumb screw 43 for securing thereupon a clamping plate 44. Shiftably held between the bracket 41 and the clamping plate 44 on opposite sides of the screw 43, is a pair of parallel supporting rods 45, all as best seen in Figure 2 and for purposes presently more fully appearing.

Welded or otherwise rigidly secured upon the inner ends of the supporting rods 40, are opposed parallel loaf guides 46 extending longitudinally over the conveyor table 4 to a point spaced from the rearward margin of the dead plate 32 by a distance substantially greater than the width of a single loaf fraction.

At their rearward extremities, the guide members 46 are each provided with a pair of vertically spaced registering pivot eyes 47, suitably journaled in which is a pintle 48, and pinned on a projecting end of the pintle 48, is a crank arm 49 provided with a longitudinal slot 50.

Similarly pinned or otherwise fixed upon each of the pintles 48 intermediate the pivot eyes 47, are rotary hinge members 51 each preferably integrally provided with swingable or so-called "switching" guide members 52. It should be noted in this connection that the guide members 52 are not parallel, but are angularly disposed with respect to each other by a small angular departure, as indicated in Figure 1 by the angle α, for purposes presently more fully appearing.

Bolted or otherwise fixed upon the outer faces of the side rails 5, 6, is a pair of transversely aligned members 53 each preferably integrally provided with a downwardly projecting extension-bracket 54 having the shape generally of an inverted L and provided in its vertical leg 55 with a fixed bearing bushing 56. Mounted in, and extending through, the horizontal leg 57 of the bracket 54 and supported along its side face against the member 53, is a vertically extending elongated bearing sleeve 58 projecting upwardly substantially beyond the upper margin of the side rails 5, 6, all as best seen in Figure 3 and for purposes presently more fully appearing.

Journaled at its ends in the bushings 56 and extending horizontally beneath the return run 20 of the conveyor chains 18, is a shaft 59 provided on its outwardly extended end with a sprocket 60 connected by means of a chain 61 to the sprocket 30. Pinned or otherwise fixed to the shaft 59 just inwardly of the bracket legs 55, are bevel gears 62, all as best seen in Figure 3 and for purposes presently more fully appearing.

Rotatively mounted in, and extending through, the sleeves 58, is a pair of stub-shafts 63 provided at their lower extremities with bevel gears 64 having meshing engagement with the bevel gears 62 and at their upper extremities provided with crank members 65, which latter are, in turn, provided with apertures 66 for rotatively receiving connector blocks 67. Mounted in the connector blocks 67 for longitudinally shiftable adjustment and secured in adjusted position by means of set screws 68, are pitmans or connecting rods 69 each provided at its inner end with a flattened and apertured bearing eye 70 for rotatively receiving a bearing stud 71 having a flat retaining head 72 and a downwardly extending threaded shank 73 projecting through the slot 50 of the switching guide crank arm 49 and provided on its lower end with a knurled tightening nut 74, all as best seen in Figure 3 and for purposes presently more fully appearing.

Welded or otherwise fixed upon the inner ends of the rods 45, is a pair of opposed parallel straight guides 75 extending from a point just rearwardly of the arc of swing of the switching guides 52 to a point above the rear dead plate 35, as best seen in Figures 1 and 2 and for purposes presently more fully appearing. As will later more fully appear, it is preferable in adjusting the straight guides 75 to provide a space greater than the combined length of the loaf fractions to be aligned therebetween. It is hence desirable to provide a pair of adjustable auxiliary guides 76 associated with the intake conveyor 11 of the wrapping machine C, which are in registration at their forward ends with the ends of the guides 75 and are inclined obliquely inwardly toward each other to compensate for the free distance between the loaf fractions due to the adjustment of the guides 75 and, accordingly, shift the loaf fractions into endwise abutment.

If, in use, it is desired to align two fractions in full-length loaf formation, the guides 75 and 76 are suitably adjusted, as above described, to accommodate the full-length loaf therebetween. The forward guides 46 are similarly adjusted to accommodate a single fraction therebetween. The pitmans 69 are adjusted for length in the connecting blocks 68 and for amplitude of arc, or so-called throw, by shifting the bearing studs 71 along the slots 50 of the switch guide crank arms 49. The pin clutch disk 29 is shifted into engagement with the hub 26 of the sprocket 22, so that the flight rods b will be driven at twice the speed of the flight rods c. Similarly the pin clutch 31 is engaged with the sprocket 30.

As the mechanism is started in operation, the loaf fractions *l, l'*, are delivered in consecutive alignment across the dead-plates 32' and 32 to the conveyor table 4 between the guides 46. As a loaf fraction *l* is deposited on the conveyor table 4, it is progressed rearwardly by one of the flight bars *b*. At the same time, the switch guides 52 are swung over to the position shown in full lines in Figure 1, thus shifting the loaf fraction *l* over against the one straight guide 75, as shown, whence it is further progressed by the flight bar *b* and finally delivered upon one side of the rear dead plate 35. Since the switch guides 52 are non-parallel, flaring angularly outwardly from each other on the angle ∝, as above pointed out, there will be sufficient increasing space between said guides 52 to freely accommodate the diagonal dimension of the successive traveling loaf fractions *l*, as best seen in Figure 1.

The succeeding fraction *l'* is meanwhile progressed by a succeeding flight bar *b* and is shifted to the opposite side of the conveyor table 4 against the other straight guide 75, being finally delivered upon the rear dead plate 35 in axially spaced alignment with the companion loaf fraction *l*. Since the flight bars *c* of the intake conveyor 11 are moving at one-half the speed of the flight bars *b*, the next succeeding loaf fractions *l, l'*, upon being progressed to the dead plate 35, will push both of the previous fractions *l, l'*, off the dead plate 35 in front of one of the flight bars *c* of the intake conveyor 11 for delivery to the wrapping machine C. As the aligned loaf fractions *l, l'*, are moved into the intake conveyor 11, they are shifted toward each other into endwise abutment by the oblique auxiliary guides 76.

In case it becomes necessary to accommodate loaves or loaf fractions of a different length, the transfer conveyor B may be readily re-adjusted by shifting the guides 75, the guides 46, and changing the length and throw of the pitmans 69, as above described. If desired, the driving mechanism for the shifting guides may be disconnected by shifting the pin clutch 31 out of engagement with the sprocket 30 and adjusting the guides 46, 52, and 75 into alignment, as shown in Figure 4, in the provision of a simple, non-shifting transfer conveyor.

Thus the movement of the shiftable guides 52 is entirely automatic and in timed relation with the propelled loaf-fractions, the guides 52 being also readily relatively adjusted to accommodate loaf-fractions of different length.

The mechanism fulfills in every respect the objects stated, and it should be understood that changes and modifications in the form, construction, arrangement, and combination of the several parts of the mechanism may be made and substituted for those herein shown and described without departing from the nature and principle of my invention.

Having thus described my invention, what I claim and desire to secure by Letters Patent is:

1. An article handling machine including a table, a conveyor operatively mounted for movement over the table, driving means for actuating the conveyor, a pair of spaced guides mounted for swingable movement over the table, a crank arm operatively mounted on each of said swingable guides, and pitmans operatively connected to said crank arms and to the conveyor driving means for swingably actuating said guides in timed relation to the movement of the conveyor.

2. An article handling machine including a table, a conveyor operatively mounted for movement over the table, driving means for actuating the conveyor, a pair of spaced guides mounted for swingable movement over the table, a crank arm operatively mounted on each of said swingable guides, and pitmans operatively connected to each of said crank arms and adjustably connected to the conveyor driving means for actuating the swingable guides in timed relation to the movement of the conveyor.

3. An article handling machine comprising, in combination, a table for receiving the articles in a single row, means for conveying the articles over the table, a pair of spaced individually pivoted guides for receiving the articles in succession, and means including opposed pitmans having engagement with the guides and the conveying means for oscillatorily swinging said guides in unison in timed relation to the movement of the conveying means for alternately shifting the articles in opposite directions obliquely relatively to said initial row for continued movement by the conveying means over the table in a plurality of rows with the articles in one row axially aligned with the articles in an adjacent row.

4. An article handling machine comprising, in combination, a table, means including a pair of spaced stationary guides for depositing the articles upon the table in a single row, means for conveying the deposited articles over the table, a pair of second guides individually pivoted on the first guides for receiving the articles in succession from the first guides for swingable movement over the table, and means including opposed pitmans having connection with the second guides and with the conveying means for oscillatorily swinging the second guides in unison in timed relation to the movement of the conveying means for alternately shifting the articles in opposite directions obliquely relatively to said initial row for continued movement by the conveying means over the table in a plurality of rows with the articles in one row axially aligned with the articles in an adjacent row.

5. An article handling machine comprising, in combination, a support, means for conveying the articles over the support, means including a pair of stationary guides spaced for depositing the articles upon the support in a single row, a second pair of guides spaced longitudinally from the first guides and spaced one from the other for receiving the articles in a plurality of spaced rows, means including a third pair of guides swingable over the table and spaced for receiving the articles in succession and alternately shifting the same in opposite directions relatively to said initial row for continued movement by the conveying means over the support and between the second guides in a plurality of spaced rows, and a fourth pair of guides convergingly spaced for shifting the conveyed articles into abutting rows.

6. In an article handling machine, a pair of individually pivoted guides for receiving the articles therebetween, means for progressing the articles through said guides, means including pitmans for oscillatorily actuating the guides for shifting the articles traveling therebetween, and means for adjustably varying the space between the guides and the length and throw of the pitmans for accommodating articles of different dimensions.

7. A transfer conveyor comprising a table having a plurality of spaced parallel chain-driven flight bars operatively mounted for movement thereacross, driving means operatively connected with said flight bars, a pair of spaced parallel guides operatively mounted over the table, a pair of spaced guides pivotally mounted upon the first guides, a crank arm operatively mounted on each of said swingable guides, and pitmans adjustably connected to the crank arms, said pitmans being drivingly connected to the flight bar driving means for swingably actuating said swingable guides in timed relation to the movement of said flight bars.

8. An article conveyor comprising a table having a plurality of chain-driven flight bars for movement thereacross, a first pair of adjustably spaced parallel guides operatively mounted for laterally shiftable movement toward and away from each other over the table, a second pair of spaced parallel guides operatively mounted also for laterally shiftable movement toward and away from each other over the table and disposed in longitudinally spaced relation to the first guides in the provision of a longitudinal gap, a swingable member pivotally mounted on each of the first guides and extending longitudinally toward the second guides for movement in said gap and being of a length to close said gap when the first guides are adjusted respectively to longitudinal alignment with the second guides, and means for optionally actuating said swingable guides in timed relation to the movement of the flight bars.

WALTER A. THUM.